US 12,551,257 B2

(12) United States Patent
Rapalo et al.

(10) Patent No.: US 12,551,257 B2
(45) Date of Patent: Feb. 17, 2026

(54) COLLINEAR REDUCTION CLAMP

(71) Applicants: Smith & Nephew, Inc., Memphis, TN (US); Smith & Nephew Orthopaedics AG, Zug (CH); Smith & Nephew Asia Pacific Pte. Limited, Singapore (SG)

(72) Inventors: Gabriel E. Rapalo, Arlington, TN (US); Ramprasad Papannagari, Collierville, TN (US); Charles R. Bennett, Memphis, TN (US); Nicholas S. Ritchey, Collierville, TN (US)

(73) Assignees: SMITH & NEPHEW, INC., Memphis, TN (US); SMITH & NEPHEW ORTHOPAEDICS AG, Zug (CH); SMITH & NEPHEW ASIA PACIFIC PTE. LIMITED, Singapore (SG)

( * ) Notice: Subject to any disclaimer, the term of this patent is extended or adjusted under 35 U.S.C. 154(b) by 197 days.

(21) Appl. No.: 18/367,358

(22) Filed: Sep. 12, 2023

(65) Prior Publication Data
US 2024/0090931 A1  Mar. 21, 2024

Related U.S. Application Data

(60) Provisional application No. 63/406,516, filed on Sep. 14, 2022.

(51) Int. Cl.
*A61B 17/88* (2006.01)
*A61B 17/90* (2006.01)
(Continued)

(52) U.S. Cl.
CPC ...... *A61B 17/8872* (2013.01); *A61B 17/8866* (2013.01); *A61B 17/90* (2021.08); *A61B 90/08* (2016.02); *A61B 2017/564* (2013.01)

(58) Field of Classification Search
CPC ............ A61B 17/8866; A61B 17/8872; A61B 17/8894; A61B 2017/681
See application file for complete search history.

(56) References Cited

U.S. PATENT DOCUMENTS

| 6,030,387 A * | 2/2000 | Ballier ................. A61B 17/62 606/104 |
| 8,002,812 B2 | 8/2011 | Falahee et al. |

(Continued)

OTHER PUBLICATIONS

European Patent Office, European Search Report, dated Dec. 19, 2023, 8 pages.

(Continued)

*Primary Examiner* — Amy R Sipp
(74) *Attorney, Agent, or Firm* — KDW Firm PLLC

(57) ABSTRACT

A collinear reduction clamp including a compression rod, an arm, and an advancing mechanism for moving the compression rod relative to the arm. In some examples, the rod may include a cannulated bore to enable a bone screw to be inserted therein. The rod may also include a cap. The cap including a bone screw washer. In use, a bone screw can be inserted through the cannulated bore of the rod, the bone screw passing through the washer thereby coupling the washer to the bone screw thereby enabling both the bone screw and the washer to be inserted into the patient's bone directly at the compression site. In some examples, the cannulated bore may be used in combination with first and second tubes and a guidewire to enable a cannulated bone screw to be inserted therein. In some examples, the arm may be configured as a length adjusting arm.

11 Claims, 10 Drawing Sheets

(51) Int. Cl.
*A61B 90/00* (2016.01)
*A61B 17/56* (2006.01)

(56) References Cited

U.S. PATENT DOCUMENTS

| | | | | |
|---|---|---|---|---|
| 2002/0183759 A1* | 12/2002 | Green | ................ | A61B 17/8866 |
| | | | | 606/86 R |
| 2005/0234459 A1 | 10/2005 | Falahee et al. | | |
| 2014/0052138 A1* | 2/2014 | Kemper | ............. | A61B 17/8872 |
| | | | | 606/104 |
| 2019/0142488 A1* | 5/2019 | Wang | ................ | A61B 17/6408 |
| | | | | 606/96 |
| 2022/0330996 A1* | 10/2022 | German | ............. | A61B 17/8861 |

OTHER PUBLICATIONS

Linear Reduction Clamp— © 2021 Stryker—Brochure, 2 pages.
Collinear Reduction Clamp—Surgical Technique Brochure— © DePuy Synthes Trauma—Jan. 2021, 12 pages.
Linear Reduction Clamp—System Instructions— © Sep. 2021 Stryker, 20 pages.

* cited by examiner

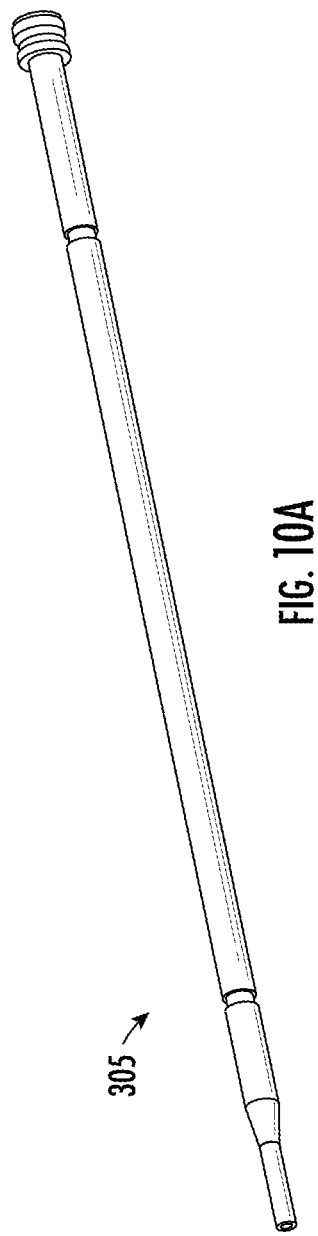
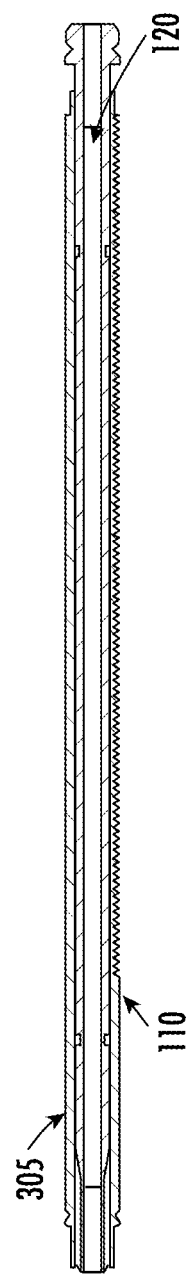
FIG. 10A
FIG. 10B

COLLINEAR REDUCTION CLAMP

CROSS-REFERENCE TO RELATED APPLICATIONS

This is a non-provisional of, and claims the benefit of the filing date of, U.S. provisional patent application No. 63/406,516, filed Sep. 14, 2022, entitled "Collinear Reduction Clamp," the entirety of which application is incorporated by reference herein.

FIELD OF THE DISCLOSURE

The present disclosure relates generally to orthopedic devices and methods for facilitating fracture alignment, and more particularly to a collinear reduction clamp, accessories, and corresponding methods of use.

BACKGROUND OF THE DISCLOSURE

People suffer bone fractures each year. In many instances, a person that suffers a bone fracture is required to use a bone alignment device such as, for example, a collinear reduction clamp, to linearly and/or axially align two or more bones, bone fragments, bone pieces, etc. (terms used interchangeably herein without the intent to limit or distinguish). For example, in use, conventional collinear reduction clamps include first and second bone contacting tips that contact a human bone on either side of a fracture so that sufficient compressive forces can be generated to reduce the fracture, i.e., to close the fracture. A fixation member (e.g., a wire or bone screw) can thereafter be used to secure the relative positions of the bones.

However, conventional collinear reduction clamps suffer from some disadvantages. For example, it would be beneficial to secure the fracture using a bone screw inserted through the collinear reduction clamp. In particular, to provide a bone screw and washer through a cannulated bore of the collinear reduction clamp to secure the fracture. That is, conventional collinear reduction clamps do not provide any mechanism for inserting a bone screw and washer through the device to secure the fracture at the compression site. In addition, and/or alternatively, it would be beneficial to enable utilization of a cannulated bone screw.

It is with respect to these and other considerations that the present disclosure may be useful.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

A collinear reduction clamp is disclosed. The collinear reduction clamp including first and second bone contacting tips for contacting, engaging, or the like, a patient's bone on either side of a fracture so that sufficient compressive force can be generated to reduce the fracture (e.g., close the fracture). In some examples, the collinear reduction clamp includes a compression, feed, or advancing rod, one or more interchangeable arms, and an advancing mechanism for moving (e.g., advancing) the compression rod relative to the arm.

In any preceding or subsequent example, the advancing mechanism may be in the form of a pistol grip including first and second arms or pistol grips.

In any preceding or subsequent example, the compression rod includes a plurality of ratchets formed thereon (e.g., ratchets may be formed along a bottom surface of the compression rod). The advancing mechanism includes a ratchet plate. Activation of the advancing mechanism causes the ratchet plate to interact with the plurality of ratchets formed on the compression rod to advance the compression rod, and hence the first bone contacting tip, towards the second bone contacting tip (e.g., moving or squeezing the first arm or pistol grip relative to the second arm or pistol grip causes the ratchet plate to interact with the plurality of ratchets formed on the compression rod to advance (e.g., move) the compression rod thereby compressing the patient's fracture).

In any preceding or subsequent example, the interchangeable arm may be arranged and configured to be axially moveable (e.g., slidable) to adjust a length thereof. For example, the length adjusting arm may include a first segment arranged and configured to engage the collinear reduction clamp and a second segment that is axially adjustable relative to the first segment. Thus arranged, the length of the length adjusting arm can be adjusted.

In any preceding or subsequent example, the compression rod may be cannulated. In use, the cannulated compression rod enables a bone screw to pass therethrough so that a bone screw can be inserted into the patient's bone in-between the first and second bone contacting tips associated with the compression rod and arm, respectively.

In any preceding or subsequent example, the compression rod may include a spiked washer or cap coupled to an end thereof. The cap including a bone screw washer therein. In use, when used in combination with the cannulated bore, a bone screw can be inserted through the cannulated bore of the compression rod, the bone screw passing through the bone screw washer positioned within the cap thereby coupling, loading, etc. the bone screw washer to the bone screw and thus enabling both the bone screw and the bone screw washer to be inserted into the patient's bone.

As such, in any preceding or subsequent example, an exemplary method of use for inserting a bone screw along with a bone screw washer is disclosed. In use, the first and second bone contacting tips of the collinear reduction clamp can be positioned on either side of a patient's fractured bone. Thereafter, the compression rod, and hence the first bone contacting tip, can be advanced relative to the arm, and hence the second bone contacting tip, thereby compressing the fracture. Next, a bone screw can be inserted through the cannulated bore of the compression rod. The bone screw receiving the bone screw washer as the bone screw is advanced through the compression rod and the cap coupled thereto prior to being inserted into the patient's bone. Optionally, additional bone screw washers can be loaded within the cap as needed.

In any preceding or subsequent example, the collinear reduction clamp may be used to insert a cannulated bone screw. That is, in some examples, in an exemplary method of use, the first and second bone contacting tips of the collinear reduction clamp can be positioned on either side of a patient's fractured bone. Thereafter, the compression rod can be advanced relative to the arm compressing the fracture. Next, one or more tubes can be inserted into the cannulated bore of the compression rod. For example, first and second tubes (e.g., a first outer drill tube and a second inner guidewire tube) can be inserted into the cannulated bore of the compression rod. In use, with the second tube positioned within the first tube, the tubes may be inserted into the cannulated bore of the compression rod. Next, a guidewire can be inserted through the tubes. Subsequently, the second inner guidewire tube can be removed. Thereafter, a drill can be inserted through the cannulated bore of the compression rod and the first outer drill tube using the guidewire as a guide. Subsequently, the first outer drill tube can be removed from the cannulated bore of the compression rod. Next, a cannulated bone screw can be inserted into the patient's bone using the guidewire positioned within the cannulated bore of the compression rod. Finally, the guidewire and collinear reduction clamp can be removed leaving the cannulated bone screw in place. In addition, when used in combination with the cap and bone screw washer as previously described, the cannulated bone screw can be coupled with a bone screw washer.

In one example, a collinear reduction clamp is disclosed. The collinear reduction clamp including a body, a compression rod, an arm, and an advancing mechanism. The compression rod including a first end, a second end, and a cannulated bore extending between the first end and the second end, the cannulated bore being arranged and configured to enable a bone screw to pass therethrough, the first end including a first bone contacting tip, the compression rod being operatively coupled to the body. The arm including a first end and a second end, the first end of the arm including a second bone contacting tip, wherein, in use, the first and second bone contacting tips are configured to be positioned on either side of a bone. The advancing mechanism is configured to move the compression rod relative to the arm, and hence the first bone contacting tip relative to the second bone contacting tip. The first bone contacting tip includes a bore aligned with the cannulated bore of the compression rod and a bone screw washer positioned within the bore of the first bone contacting tip so that, in use, insertion of the bone screw through the cannulated bore of the compression rod causes the bone screw to pass through the bone screw washer located within the first bone contacting tip thereby coupling the bone screw washer onto the bone screw thereby enabling both the bone screw and the bone screw washer to be inserted into the patient's bone. The bore of the first bone contacting tip includes a recess formed therein for receiving an elastically expandable band arranged and configured to hold the bone screw washer therein.

In any preceding or subsequent example, the first bone contacting tip includes a cap including a plurality of teeth extending therefrom for contacting the patient's bone.

In any preceding or subsequent example, the first bone contacting tip includes a preloaded bone screw washer.

In any preceding or subsequent example, the elastically expandable band is configured as a C-shaped ring.

In any preceding or subsequent example, the elastically expandable C-shaped ring includes a chamfered surface or edge configured to contact a head of the bone screw to facilitate expansion of the C-shaped ring.

In any preceding or subsequent example, the second bone contacting tip includes a hook configuration.

In any preceding or subsequent example, the advancing mechanism includes a pistol grip including a first pistol grip and a second pistol grip; and the compression rod includes a plurality of ratchets formed on a bottom surface thereof, the advancing mechanism includes a ratchet plate associated with the first pistol grip so that, in use, movement of the first pistol grip relative to the second pistol grip causes the ratchet plate to interact with the plurality of ratchets formed on the compression rod to move the compression rod relative to the arm.

In any preceding or subsequent example, the collinear reduction clamp further includes a release mechanism moveable between first and second positions, wherein, in the first position, the release mechanism prevents movement of the compression rod relative to the body except upon activation of the advancing mechanism, in the second position, the compression rod is freely moveable relative to the body.

In any preceding or subsequent example, the release mechanism includes a gear arranged and configured to engage the plurality of ratchets formed along the bottom surface of the compression rod.

In any preceding or subsequent example, the arm is arranged and configured to be interchangeable so that the arm is selectable from a plurality of arms having different configuration.

In any preceding or subsequent example, the arm is arranged and configured to be rotatable relative to the body, the compression rod, or both.

In any preceding or subsequent example, the arm is arranged and configured to be axially moveable to adjust a length thereof.

In any preceding or subsequent example, the arm includes a first segment arranged and configured to operatively coupled to the body and a second segment that is axially adjustable relative to the first segment to adjust an overall length thereof.

A method of inserting a bone screw into a patient's bone is also disclosed. In some examples, the method includes positioning first and second bone contacting tips of a collinear reduction clamp on either side of a patient's fractured bone; moving the first bone contacting tip relative to the second bone contacting tip to compress the patient's fractured bone; inserting a bone screw through a cannulated bone of a compression rod of the collinear reduction clamp, the compression rod including the first bone contacting tip at an end thereof; passing the bone screw through the first bone contacting tip and a bone screw washer positioned within the first bone contacting tip so that the bone screw receives the bone screw washer as the bone screw is moved through the compression rod, the bore of the first bone contacting tip including a recess formed therein for receiving an elastically expandable band arranged and configured to hold the bone screw washer therein; and inserting the bone screw and bone screw washer into the patient's bone.

In any preceding or subsequent example, the method further includes reloading a bone screw washer into the first bone contacting tip.

A method of inserting a cannulated bone screw into a patient's bone is also disclosed. In some examples, the method includes positioning first and second bone contacting tips of a collinear reduction clamp on either side of a patient's fractured bone; moving the first bone contacting tip relative to the second bone contacting tip to compress the patient's fractured bone; inserting one or more tubes into a cannulated bore of a compression rod of the collinear reduction clamp, the compression rod including the first bone contacting tip at an end thereof; inserting a guidewire through the one or more tubes; inserting a cannulated bone screw into the patient's bone using the guidewire positioned within the cannulated bore of the compression rod; and removing the guidewire and the collinear reduction clamp leaving the cannulated bone screw in place.

In any preceding or subsequent example, inserting one or more tubes into the cannulated bore of the compression rod includes inserting a first outer tube and a second inner tube, the first outer tube being inserted into the cannulated bore, the second inner tube being inserted into the first outer tube.

In any preceding or subsequent example, with the second inner tube positioned within the first outer tube, the first and second tubes are inserted into the cannulated bore of the compression rod.

In any preceding or subsequent example, with the guidewire inserted into the first outer tube and the second inner tube, removing the second inner tube.

In any preceding or subsequent example, the method further includes drilling a hole into the patient's bone using the guidewire and the first outer tube as a guide; and subsequently removing the first outer tube from the cannulated bore of the compression rod.

Examples of the present disclosure provide numerous advantages. For example, by utilizing a collinear reduction clamp relying on a ratcheting mechanism to advance and hold the compression rod relative to the arm, increased compression can be achieved. In addition, and/or alternatively, by utilizing a cap including a bone screw washer, a bone screw and a bone screw washer can be inserted through the collinear reduction clamp and into the patient's bone in-between the first and second bone contacting tips of the compression rod and arm, respectively, thereby providing increased fixation directly at the point of compression. In addition, and/or alternatively, a cannulated bone screw can be utilized.

Further features and advantages of at least some of the examples of the present disclosure, as well as the structure and operation of various examples of the present disclosure, are described in detail below with reference to the accompanying drawings.

BRIEF DESCRIPTION OF THE DRAWINGS

By way of example, specific examples of the disclosed device will now be described, with reference to the accompanying drawings, in which:

FIG. 10A illustrates a perspective view of an example of an outer drill tube that may be used in the collinear reduction clamp shown in FIG. 1; and FIG. 10B illustrates a cross-sectional view of the outer drill tube shown in FIG. 10A positioned within the cannulated bore of the collinear reduction clamp shown in FIG. 1.

Figure 1:
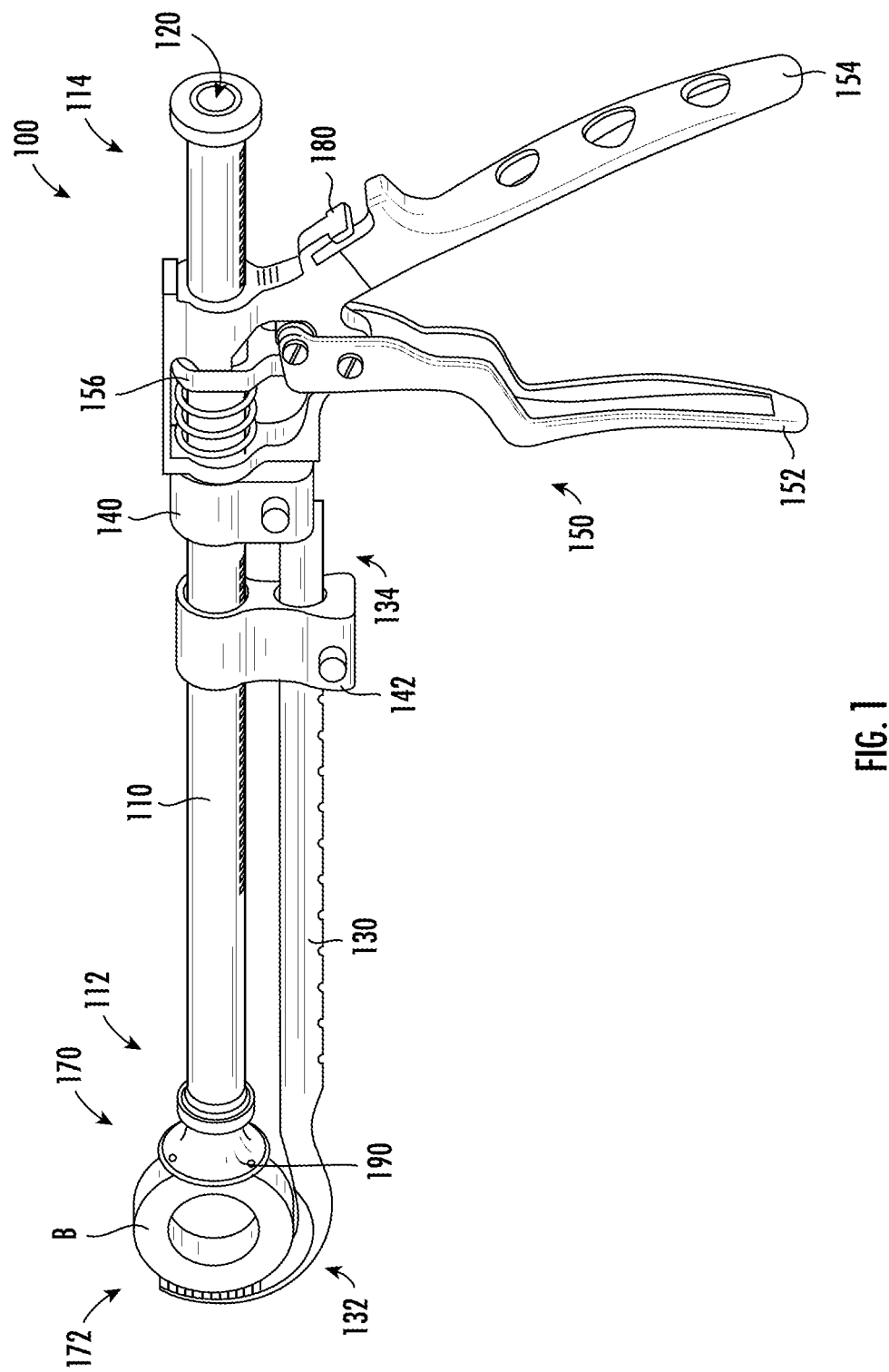
FIG. 1 illustrates a perspective view of a collinear reduction clamp in accordance with one or more features of the present disclosure, the collinear reduction clamp including a cap and an arm.
Figure 2:
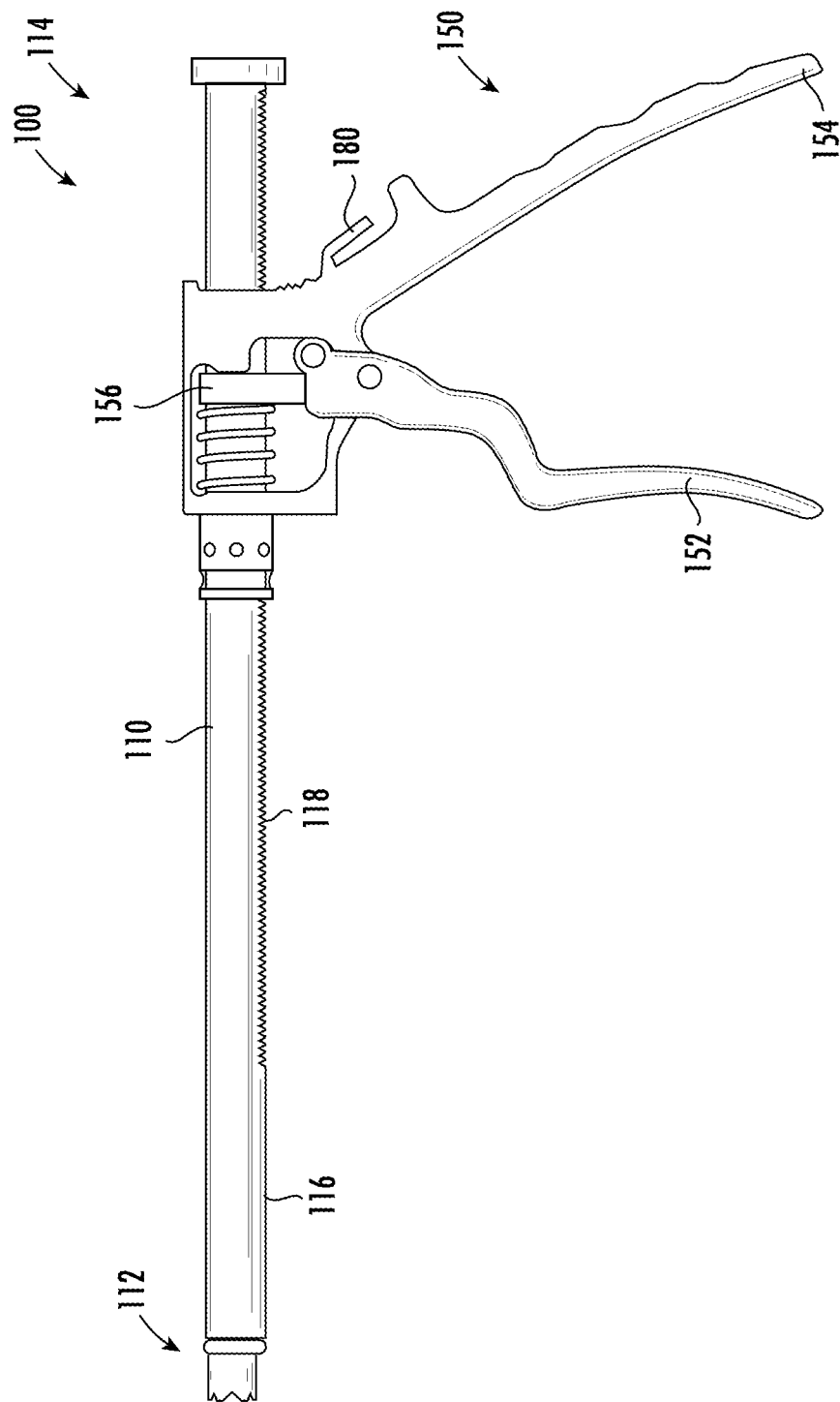
FIG. 2 illustrates a side view of the collinear reduction clamp shown in FIG. 1 with the cap and the arm removed.
Figure 3:
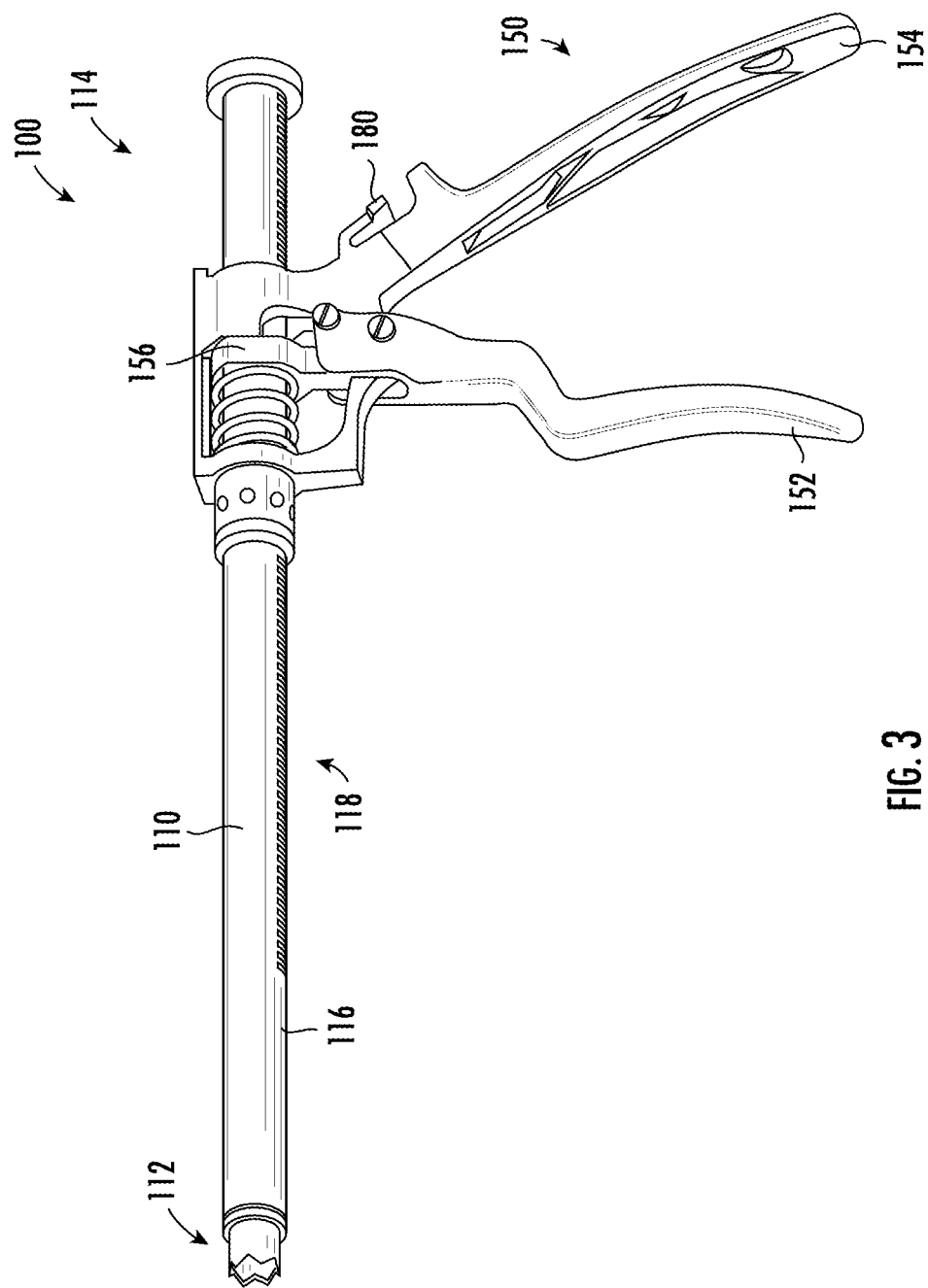
FIG. 3 illustrates a perspective view of the collinear reduction clamp shown in FIG. 2.
Figure 4:
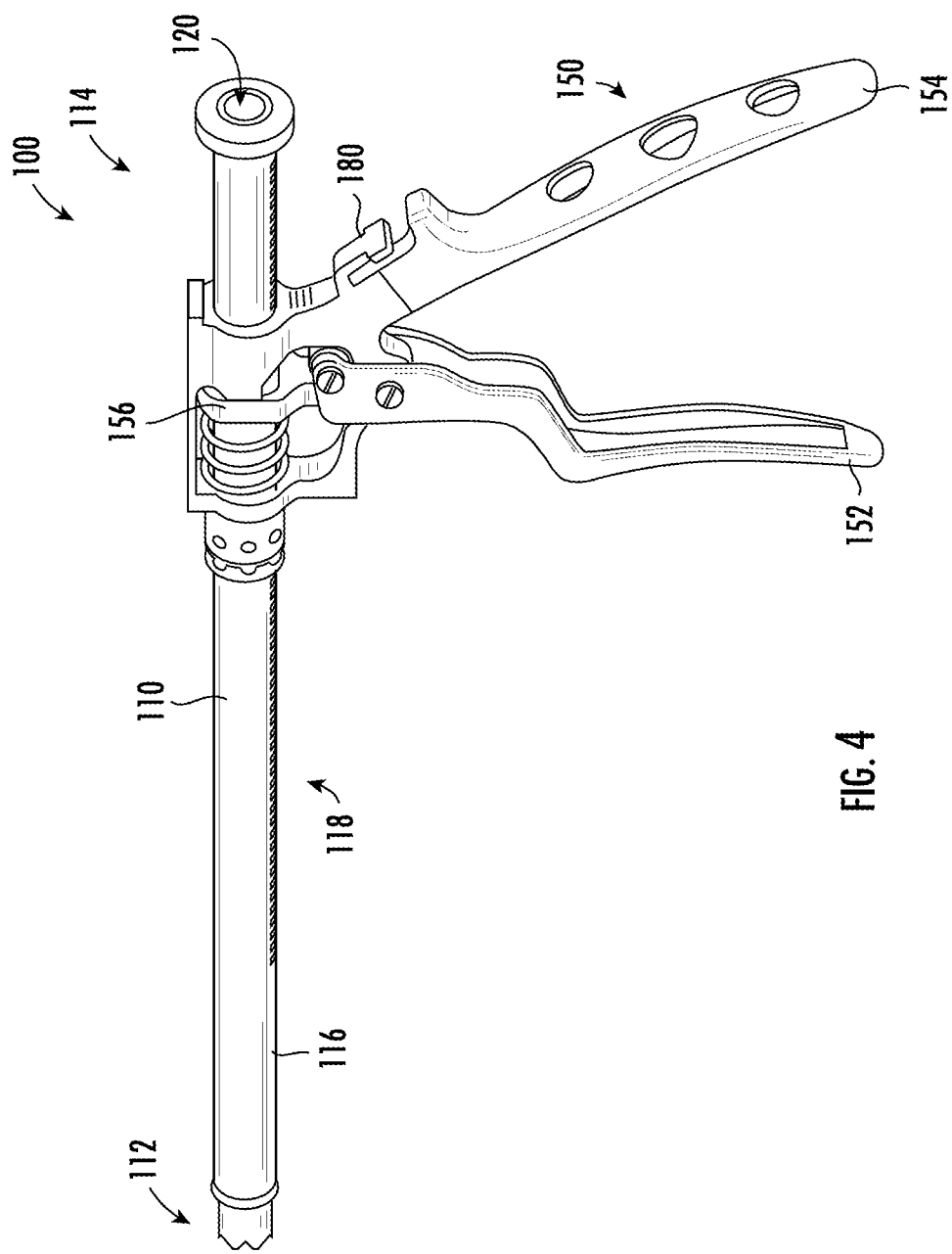
FIG. 4 illustrates an alternate perspective view of the collinear reduction clamp shown in FIG. 2.
Figure 5:
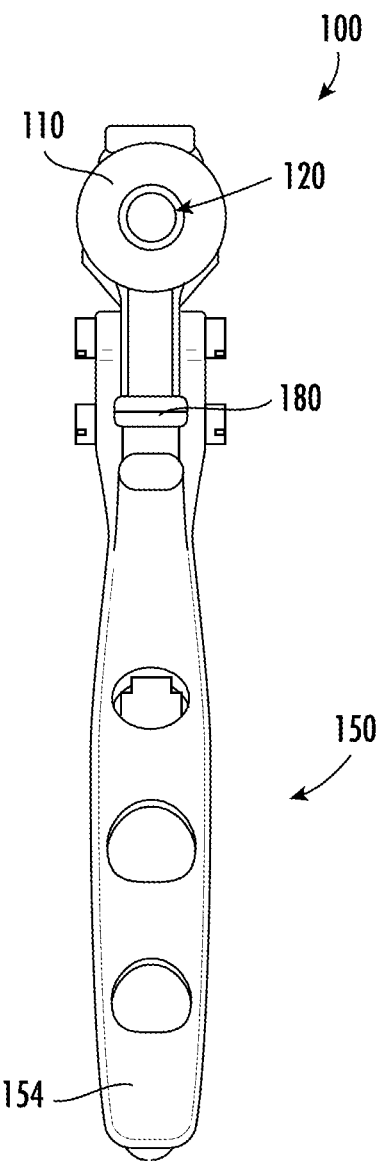
FIG. 5 illustrates a rear view of the collinear reduction clamp shown in FIG. 2.

The drawings are not necessarily to scale. The drawings are merely representations, not intended to portray specific parameters of the disclosure. The drawings are intended to depict various examples of the disclosure, and therefore are not considered as limiting in scope. In the drawings, like numbering represents like elements.

DETAILED DESCRIPTION

Various features or the like of a collinear reduction clamp will now be described more fully herein with reference to the accompanying drawings, in which one or more features of the collinear reduction clamp will be shown and described. It should be appreciated that the various features may be used independently of, or in combination, with each other. It will be appreciated that the collinear reduction clamp as disclosed herein may be embodied in many different forms and may selectively include one or more concepts, features, or functions described herein. As such, the collinear reduction clamp should not be construed as being limited to the specific examples set forth herein. Rather, these examples are provided so that this disclosure will convey certain features of the collinear reduction clamp to those skilled in the art.

In accordance with one or more features of the present disclosure, a collinear reduction clamp will be disclosed. In use, a collinear reduction clamp is a clamp arranged and configured to reduce a fracture within a patient's bone and/or to align (e.g., move) bone portions. As will be described herein, in use, the collinear reduction clamp includes first and second bone contacting tips for contacting, engaging, etc. a patient's bone on either side of a fracture so that sufficient compressive forces can be generated to reduce the fracture (e.g., close the fracture). In some examples, the collinear reduction clamp may include a compression, a feed, or an advancing rod (terms used interchangeably herein without the intent to limit or distinguish) and an arm (e.g., an interchangeable arm). In use, the compression rod includes, or is operatively coupled with, the first bone contacting tip. The arm includes, or is operatively coupled with, the second bone contacting tip.

As will be described in greater detail herein, in some examples, the collinear reduction clamp allows the fracture to be reduced and fixed provisionally as well as with final fixation by allowing, for example, a bone screw and/or a bone screw washer to be inserted at the site of compression, reducing the number of steps and complexity generally associated with collinear reduction clamps, which either don't enable a bone screw to be inserted through the collinear reduction clamp or which don't enable a bone screw washer to be utilized when inserting a bone screw through the collinear reduction clamp. Moreover, in some examples, the collinear reduction clamp can be utilized in combination with a bone plate. For example, enabling insertion of a bone screw through a bone screw hole formed in a bone plate positioned at the fracture site.

As will be described in greater detail herein, in some examples, the compression rod includes a cannulated bore arranged and configured to enable a bone screw to be inserted therethrough. In addition, and/or alternatively, in some examples, the compression rod includes a spiked washer, cap, or tip (terms used interchangeably herein without the intent to limit or distinguish) coupled to an end thereof. In use, the cap is arranged and configured to receive a bone screw washer therein. Thus arranged, in use, a bone screw can be inserted through the cannulated bore of the compression rod, the bone screw passing through the bone screw washer thereby coupling, loading, etc. the bone screw washer to the bone screw thereby enabling both the bone screw and the bone screw washer to be inserted into the patient's bone directly at the compression site in-between the first and second bone contacting tips of the collinear reduction clamp.

In some examples, the cannulated bore may be used in combination with first and second tubes and a guidewire to enable a cannulated bone screw to be inserted therein.

In some examples, the arm may be configured as a length adjusting arm including first and second segments that are axially adjustable relative to each other.

With reference to FIGS. 1-5, an example of a collinear reduction clamp 100 in accordance with one or more features of the present disclosure is shown. As illustrated, the collinear reduction clamp 100 includes a compression rod 110, one or more interchangeable arms 130, and an advancing mechanism 150. The compression rod 110 includes a first end 112 and a second end 114. Similarly, the one or more interchangeable arms 130 include a first end 132 and a second end 134. In use, the first end 112 of the compression rod 110 includes, or is operatively coupled with, a first bone contacting tip 170. The first end 132 of the arm 130 includes, or is operatively coupled with, a second bone contacting tip 172. As illustrated, the first end 132 of the arm 130 may include a hook configuration (e.g., the second bone contacting tip 172).

In use, as will be appreciated by one of ordinary skill in the art, with the arm 130 coupled to the collinear reduction clamp 100, the first and second bone contacting tips 170, 172 may be positioned on either side of a bone B. For example, the first and second bone contacting tips 170, 172 may be positioned on either side of a fractured femur or pelvic bone. Thereafter, in use, the user activates the advancing mechanism 150 causing incremental advancement of the compression rod 110 relative to a body portion 102 of the collinear reduction clamp 100 and/or the second bone contacting tip 172 (e.g., advancement of the first bone contacting tip 170 towards the second bone contacting tip 172). That is, the collinear reduction clamp 100 may be placed on a specific anatomic location with an appropriate hook component (e.g., second bone contacting tip) and reduction aid component (e.g., first bone contacting tip) to address a specific fracture type. Once in place the collinear reduction clamp 100 can be actuated, allowing the compression rod 110 to advance. Advancement of the compression rod 110 relative to the arm 130 (e.g., advancement of the compression rod 110 relative to the hook or second bone contacting tip 172) compresses the fracture "collinearly". Thereafter, as will be described in greater detail below, in accordance with one or more features of the present disclosure, the compression rod 110 can serve as a tissue protector and guide to insert a bone screw and bone screw washer to allow final fixation.

As illustrated, in some examples, the advancing mechanism 150 may be in the form of a pistol grip including first and second arms or pistol grips 152, 154, although this is but one configuration and the advancing mechanism 150 may be provided in any other suitable form or mechanism for advancing or moving the first bone contacting tip 170 relative to the second bone contacting tip 172. As illustrated, in some examples, the compression rod 110 includes a plurality of ratchets 118 formed on a bottom surface 116 thereof. The advancing mechanism 150 including a ratchet plate 156 associated with the first arm or pistol grip 152. In use, activation of the advancing mechanism 150 causes the ratchet plate 156 to interact with the plurality of ratchets 118 formed on the compression rod 110 to advance the compression rod 110, and hence the first bone contacting tip 170, towards the second bone contacting tip 172 (e.g., moving or squeezing the first arm or pistol grip 152 relative to the second arm or pistol grip 154 causes the ratchet plate 156 to interact with the plurality of ratchets 118 formed on the compression rod 110 to advance (e.g., move) the compression rod 110 towards the first end 132 of the arm 130). Thus arranged, in use, the bone B positioned between the first and second bone contacting tips 170, 172 can be compressed.

In accordance with one or more features of the present disclosure, by utilizing interconnecting ratchets, the collinear reduction clamp 100 is arranged and configured to provide increased compressive forces as compared to convention collinear reduction clamps that utilize friction. That is, in accordance with one or more features of the present disclosure, by utilizing a ratcheting mechanism, the compressive force provided by the collinear reduction clamp 100 has been found to be significantly greater than conventional collinear reduction clamps. In addition, the collinear reduction clamp 100 ability to hold the compressive force on the fracture has been found to be greater, which has been a long-standing aggravation with users.

As illustrated, in some examples, the collinear reduction clamp 100 also includes a release mechanism 180, which in its normal, rest, or first position, prevents movement of the compression rod 110 relative to the body 102 of the collinear reduction clamp 100 except upon activation of the advancing mechanism 150. However, upon activation of the release mechanism 180 (e.g., depressing or moving the release mechanism 180 to a second position), the compression rod 110 is released and thereby free to move with respect to the body 102 thus enabling the compression rod 110 to be pulled back or moved away from the second bone contacting tip 172 thereby enabling the collinear reduction clamp 100 to be disengaged from the patient's bone B. In use, the release mechanism 180 may have any suitable form now known or hereafter developed. In some examples, the release mechanism 180 may be a gear arranged and configured to engage the plurality of ratchets 118 formed along the bottom surface 116 of the compression rod 110.

As will be readily appreciated by one of ordinary skill in the art, the arm 130 may be arranged and configured to be interchangeable. Thus arranged, interchangeable arms 130 may be provided in any one of a plurality of different configurations, which may be in part based on the bone being reduced. That is, a number of different hooks and reduction aids can be connected to the collinear reduction clamp 100 to address specific fracture indications in pelvic and long-bone fractures. For example, the arm 130 may be provided in a hook configuration with varying sizes and tips to suit indication need. As will be readily appreciated by one of ordinary skill in the art, the arm 130 may be provided in a pelvic arm configuration, a Hohmann-style arm, a percutaneous arm, a bone hook-shape arm, etc. In use, the collinear reduction clamp 100 may be provided in a set including, inter alia, a plurality of interchangeable arms that the user may select from depending, in part, on the location of the patient's fracture.

In addition, and/or alternatively, in use, the arm 130 may be rotatable relative to the body 102 and/or compression rod 110 thereby enabling the hook or second bone contacting tip 172 to be orientated in different ways relative to the body 102 and/or the advancing mechanism 150.

Figure 6A:
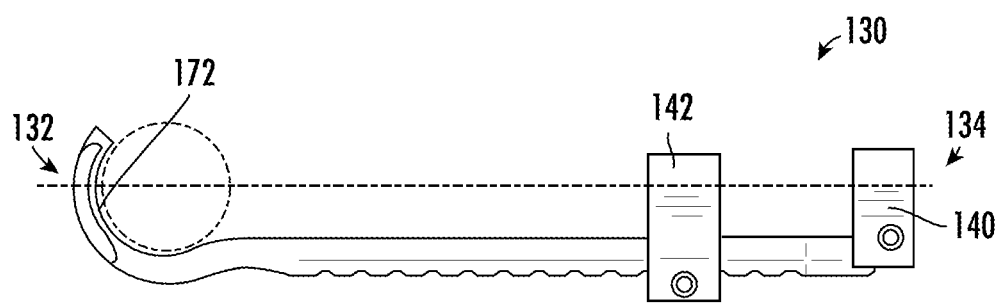
FIG. 6A illustrates a side view of an example of a length adjusting arm that may be used in the collinear reduction clamp shown in FIG. 1.
Figure 6B:
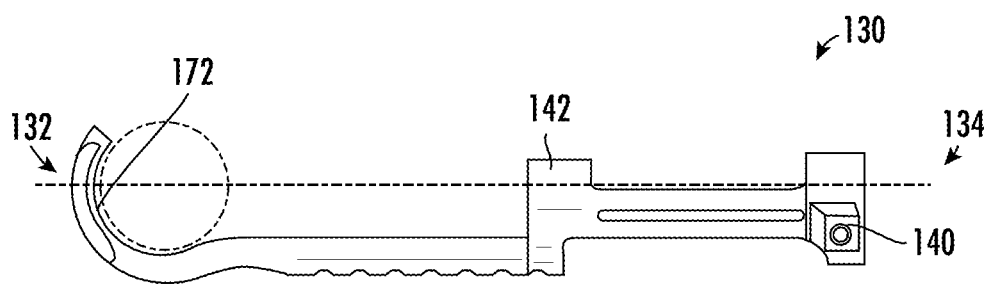
FIG. 6B illustrates a side view of an alternate example of a length adjusting arm that may be used in the collinear reduction clamp shown in FIG. 1.

With reference to FIGS. 1, 6A, and 6B, in accordance with one or more features of the present disclosure, one or more of the arms 130 may be arranged and configured to be axially moveable (e.g., slidable) to adjust a length thereof. For example, as illustrated, the length adjusting arm 130 may include a first segment 140 arranged and configured to engage, couple to, etc. the body 102 of the collinear reduction clamp 100 and a second segment 142 that is axially adjustable relative to the first segment 140. Thus arranged, the length of the length adjusting arm 130 can be adjusted. As illustrated with reference to FIG. 6A, in some examples, the second segment 142, and hence the second bone contacting tip or hook, may be axially moveable (e.g., slidable) along a length of the first segment 140. Alternatively, with reference to FIG. 6B, in some examples, the second segment 142 may be telescopic relative to the first segment 140. In either scenario, in use, the hook (e.g., second bone contacting tip 172) positioned at the first end 132 of the second segment 142 can be moved (e.g., slid) to any length to help keep the applied compression truly collinear. That is, by enabling the length of the arm 130 to be adjustable, splaying of the hook (e.g., second bone contacting tip 172) associated with conventional collinear reduction clamps is prevented, or at least minimized (e.g., splaying of the second bone contacting tip 172 formed on the first end 132 of the arm 130 when compression is applied is prevented, or at least minimized). That is, by enabling length adjustment, the moment arm of the arm 130 is shortened, and thus facilitates preventing, or at least minimizing, splaying of the second bone contacting tip 172 ensuring that compressive forces remain truly collinear. In use, the position of the second segment 142 can be secured relative to the first segment 140 by any suitable mechanism now known or hereafter developed including, for example, sets screws or the like.

In some examples, in accordance with one or more features of the present disclosure, the compression rod 110 may be cannulated. That is, the compression rod 110 may include a bore 120 extending from the first end 112 to the second end 114 thereof. In use, the cannulated bore 120 may be arranged and configured to enable a bone screw to be inserted therein. For example, the cannulated bore 120 may be arranged and configured to enable a 2.7 mm diameter bone screw (e.g., cortical bone screw) to be inserted, a 3.5 mm diameter bone screw (e.g., cortical bone screw), a 4.5 mm diameter bone screw (e.g., cortical bone screw), a 6.5 mm bone screw (e.g., cancellous bone screw), etc. As will be described in greater detail below, the cannulated bore 120 may be arranged and configured to enable a cannulated bone screw (e.g., a cannulated cancellous bone screw) to be inserted therethrough.

Figure 7A:
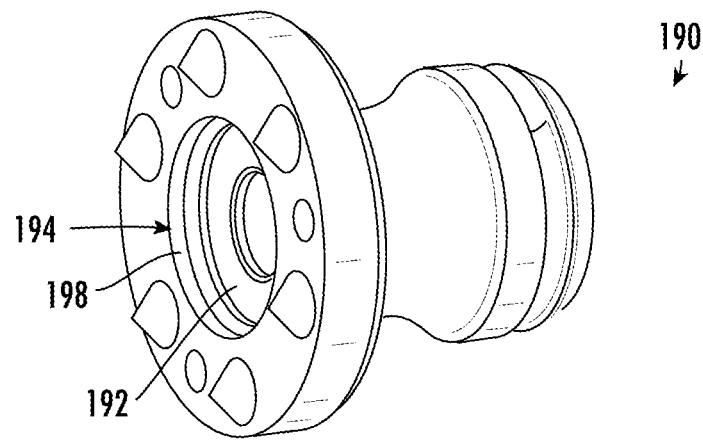
FIG. 7A illustrates a perspective view of an example of a cap that may be used in the collinear reduction clamp shown in FIG. 1.
Figure 7B:
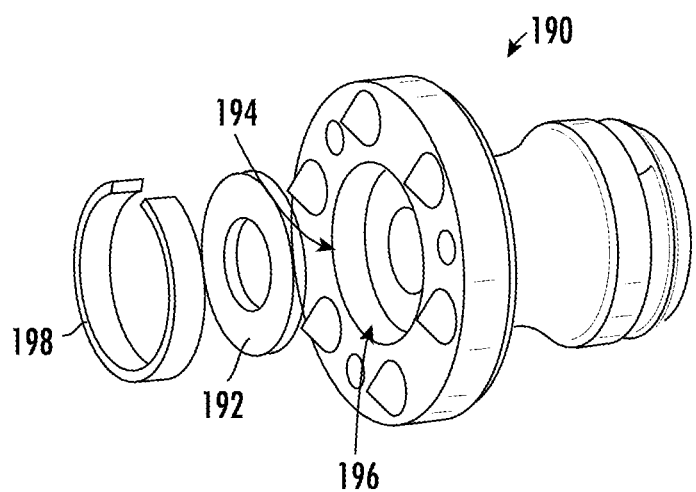
FIG. 7B illustrates an exploded, perspective view of the cap shown in FIG. 7A.

With references to FIGS. 7A and 7B, in addition, and/or alternatively, in some examples, the first end 112 of the compression rod 110 is arranged and configured to receive a cap 190. In use, the cap 190 includes the first bone contacting tip 170 for contacting the first side of the patient's bone B (FIG. 1). In use, the cap 190 may include an enlarged outer diameter relative to an outer diameter of the compression rod 110 to provide an increased surface area or diameter to assist with spreading the compressive force over a larger area. In addition, as illustrated, the bone contacting portion of the cap 190 may include a plurality of teeth extending therefrom for contacting the outer surface of the bone, and thus may also be referred to herein as a spiked cap.

In accordance with one or more features of the present disclosure, the cap 190 includes a bone screw washer 192 therein. That is, the cap 190 may be preloaded with a bone screw washer 192. Alternatively, as will be described herein, the cap 190 may be arranged and configured to enable a user to load a bone screw washer 192 therein. Thus arranged, in use, when used in combination with the cannulated bore 120, a bone screw can be inserted through the cannulated bore 120 of the compression rod 110, as the bone screw is advanced through the cannulated bore 120, the bone screw passes through the bone screw washer 192 located within the cap 190 thereby coupling, loading, etc. the bone screw washer 192 onto the bone screw thereby enabling both the bone screw and the bone screw washer 192 to be inserted into the patient's bone B. As such, in accordance with one or more features of the present disclosure, the collinear reduction clamp 100 of the present disclosure enables a bone screw and a bone screw washer 192 to be inserted through the collinear reduction clamp 100 into the patient's bone B directly at the site of reduction.

In use, the bone screw washer 192 may be preloaded into the cap 190 (e.g., cap 190 may be provided with a bone screw washer already positioned therein). Alternatively, the cap 190 may be arranged and configured to enable a user to load a bone screw washer 192 therein. For example, as illustrated, the inner bore 194 of the cap 190 may include a recess 196 arranged and configured to receive an elastically expandable band 198 arranged and configured to hold the bone screw washer 192 therein. As illustrated, in some examples, the band 198 may be configured as a C-shaped ring. In use, the C-shaped ring or band 198 is arranged and configured to be positioned within the recess 196 formed in the inner bore 194 of the cap 190. The C-shaped ring or band 198 being arranged and configured with an inner diameter arranged and configured to receive and hold the bone screw washer 192. Thus arranged, in use, a plurality of bone screw washers 192 may be provided within, for example, a tray. As needed, the user can align one of the bone screw washers 192 with the inner bore 194 of the cap 190. Thereafter, the user can press down onto the bone screw washer 192 (e.g., axially advancing the collinear reduction clamp 100 and the cap 190 relative to the bone screw washer 192). Alternatively, the user can simply insert a bone screw washer 192 into the inner bore 194 of the cap 190. In either scenario, in use, the C-shaped ring or band 198 expands within the recess 196 to receive the bone screw washer 192 therein. Thereafter, in use, the bone screw washer 192 can be released from the C-shaped ring or band 198 upon application of force such as, for example, driving or moving the bone screw through the cannulated bore 120, although this is but one configuration and the bone screw washer 192 can be coupled within the cap 190 by any suitable mechanism now known or hereafter developed. In some examples, the C-shaped ring or band 198 includes a chamfered surface or edge so that contact of the head of the bone screw with the C-shaped ring or band 198 facilitates the C-shaped ring or band 198 expanding to release the bone screw washer 192.

In use, the collinear reduction clamp 100 including the cannulated compression rod 110 and cap 190 enable larger diameter bone screws to be implanted with a bone screw washer 192. In some examples, bone screws with head diameters up to 8 mm can be inserted. That is, smaller diameter bone screws such as, for example, bone screws with 2.7 mm and 3.5 mm diameters can be coupled to a bone screw washer. Thereafter, the bone screw and washer can collectively be inserted into and through the cannulated bore of the compression rod. Alternatively, larger diameter bone screws having, for example, 5 mm and larger diameters can be inserted into the cannulated bore of the compression rod and upon passing through the cap, be coupled to a washer prior to be implanted into the patient's bone.

Figure 8:
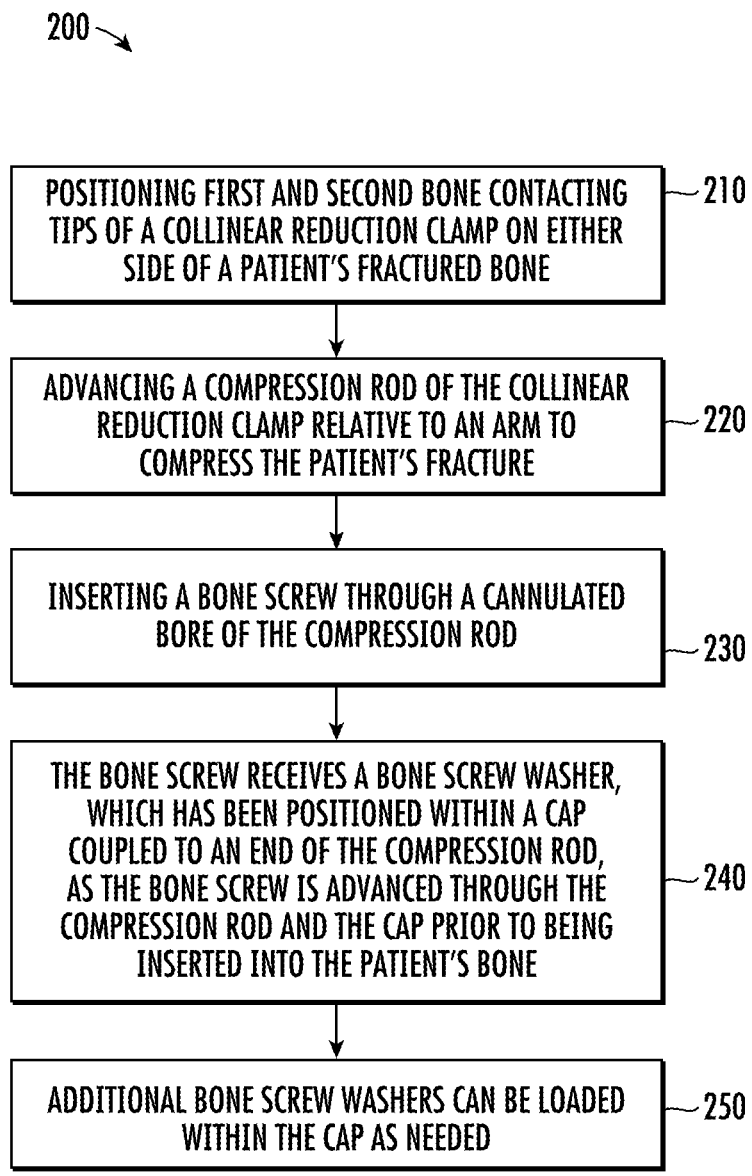
FIG. 8 is a schematic diagram of an exemplary method of inserting a bone screw and a bone screw washer using the collinear reduction clamp shown in FIG. 1 in accordance with one or more features of the present disclosure.

With reference to FIG. 8, in accordance with one or more features of the present disclosure, an exemplary method of use 200 for inserting a bone screw along with a bone screw washer is disclosed. In use, at step 210, the first and second bone contacting tips 170, 172 of the collinear reduction clamp 100 can be positioned on either side of a patient's fractured bone B. Thereafter, at step 220, the compression rod 110 can be advanced relative to the first end 132 of the arm 130 compressing the fracture. Next, at step 230, a bone screw can be inserted through the cannulated bore 120 of the compression rod 110. At step 240, the bone screw receives the bone screw washer 192 as the bone screw is advanced through the compression rod 110 (e.g., cap 190) prior to being inserted into the patient's bone B so that both the bone screw and the bone screw washer can be inserted into the patient's bone B. At step 250, additional bone screw washers can be loaded within the cap as needed.

Figure 9:
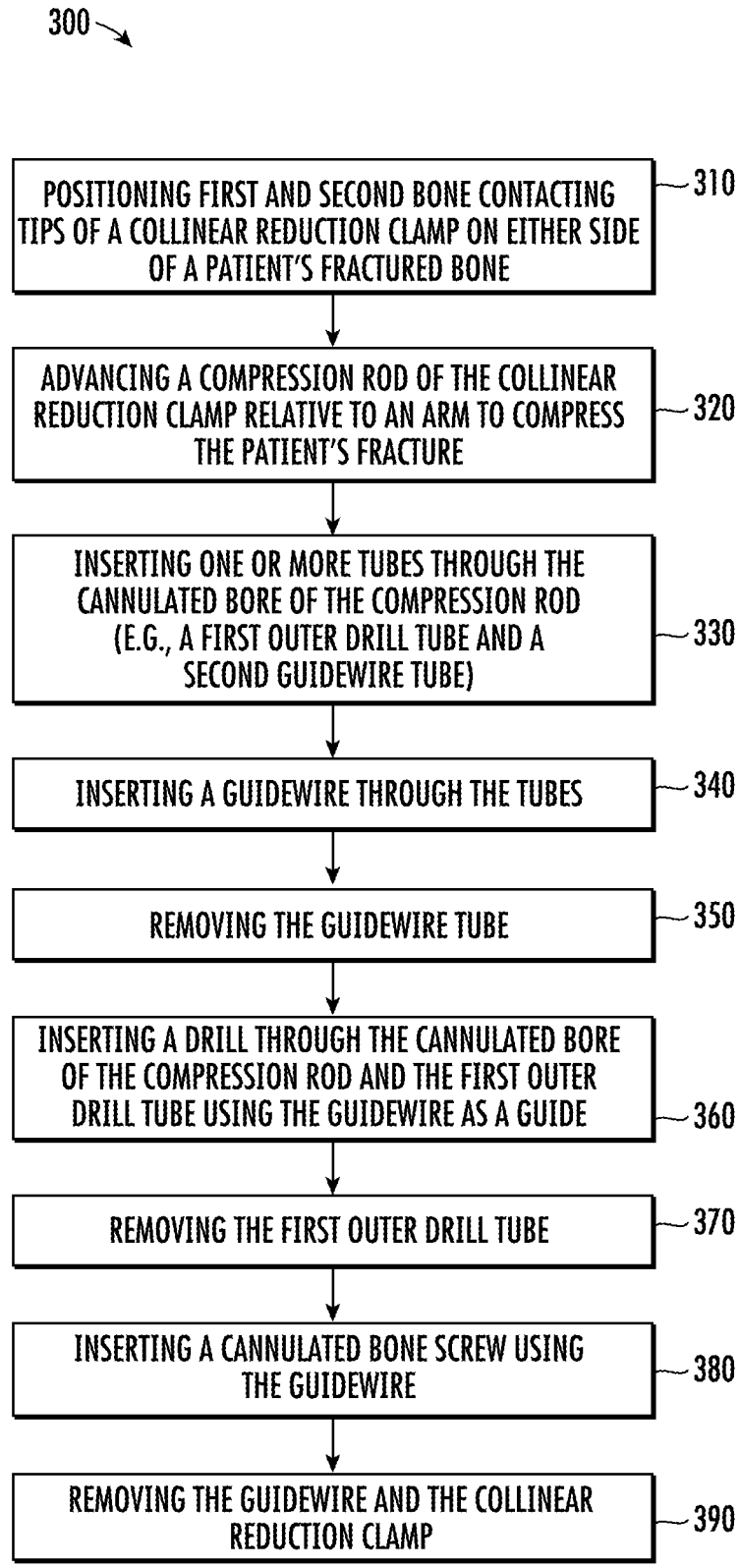
FIG. 9 is a schematic diagram of an exemplary method of inserting a cannulated bone screw using the collinear reduction clamp shown in FIG. 1 in accordance with one or more features of the present disclosure.

With reference to FIGS. 9-10B, in addition, and/or alternatively, in accordance with one or more features of the present disclosure, the collinear reduction clamp 100 of the present disclosure enables a cannulated bone screw to be inserted therein. Thus arranged, an exemplary method of inserting a cannulated bone screw is disclosed. The exemplary method 300 includes, at step 310, positioning the first and second bone contacting tips 170, 172 of the collinear reduction clamp 100 on either side of a patient's fractured bone B. Thereafter, at step 320, the compression rod 110 can be advanced relative to the first end 132 of the arm 130 compressing the fracture. Next, at step 330, one or more tubes can be inserted into the cannulated bore 120 of the compression rod 110. For example, first and second tubes (e.g., a first outer drill tube or sleeve 305 and a second inner guidewire tube or sleeve) can be inserted into the cannulated bore 120 of the compression rod 110. In use, with the second tube positioned within the first tube, the tubes may be inserted into the cannulated bore 120 of the compression rod 110. Next, at step 340, a guidewire can be inserted through the tubes and, at step 350, the second inner guidewire tube can be removed. Thereafter, at step 360, a drill can be inserted through the cannulated bore 120 of the compression rod 110 and the first outer drill tube using the guidewire as a guide. Subsequently, at step 370, the first outer drill tube can be removed from the cannulated bore 120 of the compression rod 110 and, at step 380, a cannulated bone screw can be inserted into the patient's bone B using the guidewire positioned within the cannulated bore 120 of the compression rod 110. Finally, at step 390, the guidewire and collinear reduction clamp 100 can be removed leaving the cannulated bone screw in place. In addition, when used in combination with the cap 190 and bone screw washer 192 as previously described, the cannulated bone screw can be inserted with a washer 192.

While specific features and/or examples have been shown and described, it is envisioned that modifications can be made. For example, it is envisioned that the compression rod 110 and the arm 130 can be arranged and configured to be detachable from the body 102 of the collinear reduction clamp 100. In addition, and/or alternatively, it is envisioned that the arm 130 may be cannulated to enable, for example, a cable to pass therethrough to allow for transcortical cabling, where the cable would pass back through the hole drilled through the compression rod. In addition, and/or alternatively, mating instrumentation may be used to allow additional screw placement as close as possible to the site of compression. The mating components may allow the device to work through and over a bone plate.

While the present disclosure refers to certain examples, numerous modifications, alterations, and changes to the described examples are possible without departing from the sphere and scope of the present disclosure, as defined in the appended claim(s). Accordingly, it is intended that the present disclosure not be limited to the described examples, but that it has the full scope defined by the language of the following claims, and equivalents thereof. The discussion of any example is meant only to be explanatory and is not intended to suggest that the scope of the disclosure, including the claims, is limited to these examples. In other words, while illustrative examples of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more examples or configurations for the purpose of streamlining the disclosure. However, it should be understood that various features of the certain examples or configurations of the disclosure may be combined in alternate examples, or configurations. Any example or feature of any section, portion, or any other component shown or particularly described in relation to various examples of similar sections, portions, or components herein may be interchangeably applied to any other similar example or feature shown or described herein. Additionally, components with the same name may be the same or different, and one of ordinary skill in the art would understand each component could be modified in a similar fashion or substituted to perform the same function.

Moreover, the following claims are hereby incorporated into this Detailed Description by this reference, with each claim standing on its own as a separate example of the present disclosure.

As used herein, an element or step recited in the singular and proceeded with the word "a" or "an" should be understood as not excluding plural elements or steps, unless such exclusion is explicitly recited. Furthermore, references to "one example" of the present disclosure are not intended to be interpreted as excluding the existence of additional examples that also incorporate the recited features.

The phrases "at least one", "one or more", and "and/or", as used herein, are open-ended expressions that are both conjunctive and disjunctive in operation. The terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. All rotational references describe relative movement between the various elements. Identification references (e.g., primary, secondary, first, second, third, fourth, etc.) are not intended to connote importance or priority but are used to distinguish one feature from another. The drawings are for purposes of illustration only and the dimensions, positions, order and relative to sizes reflected in the drawings attached hereto may vary.

We claim:

1. A collinear reduction clamp comprising:
   a body;
   a compression rod including a first end, a second end, and a through bore extending between the first end and the second end, the through bore being arranged and configured to enable a bone screw to pass therethrough, the first end including a first bone contacting tip, the compression rod being operatively coupled to the body;
   an arm including a first end and a second end, the first end of the arm including a second bone contacting tip, wherein, in use, the first and second bone contacting tips are configured to be positioned on either side of a patient's bone, the arm including a block moveably positioned along a length of the arm between the first and second ends; and
   an advancing mechanism for moving the compression rod relative to the arm and the first bone contacting tip relative to the second bone contacting tip;
   wherein the first bone contacting tip includes a bore aligned with the through bore of the compression rod and a bone screw washer positioned within the bore of the first bone contacting tip so that, in use, insertion of the bone screw through the through bore of the compression rod causes the bone screw to pass through the bone screw washer located within the first bone contacting tip thereby coupling the bone screw washer onto the bone screw thereby enabling both the bone screw and the bone screw washer to be inserted into the patient's bone; and
   wherein the bore of the first bone contacting tip includes a recess formed therein for receiving an elastically expandable band arranged and configured to hold the bone screw washer therein.

2. The collinear reduction clamp of claim 1, wherein the first bone contacting tip comprises a cap including a plurality of teeth extending therefrom for contacting the patient's bone.

3. The collinear reduction clamp of claim 1, wherein the bone screw washer is a preloaded bone screw washer.

4. The collinear reduction clamp of claim 1, wherein the elastically expandable band is configured as a C-shaped ring.

5. The collinear reduction clamp of claim 4, wherein the elastically expandable C-shaped ring includes a chamfered surface or edge configured to contact a head of the bone screw to facilitate expansion of the C-shaped ring.

6. The collinear reduction clamp of claim 1, wherein the second bone contacting tip includes a hook configuration.

7. The collinear reduction clamp of claim 1, wherein:
   the advancing mechanism comprises a pistol grip including a first pistol grip and a second pistol grip; and
   the compression rod includes a plurality of ratchets formed on a bottom surface thereof, the advancing mechanism includes a ratchet plate associated with the first pistol grip so that, in use, movement of the first pistol grip relative to the second pistol grip causes the ratchet plate to interact with the plurality of ratchets formed on the compression rod to move the compression rod relative to the arm.

8. The collinear reduction clamp of claim 7, further comprising a release mechanism moveable between first and second positions, wherein, in the first position, the release mechanism prevents movement of the compression rod relative to the body except upon activation of the advancing mechanism, in the second position, the compression rod is freely moveable relative to the body.

9. The collinear reduction clamp of claim 1, wherein the arm is arranged and configured to be interchangeable so that the arm is selectable from a plurality of arms having different configuration.

10. The collinear reduction clamp of claim 1, wherein the arm is arranged and configured to be rotatable relative to the body, the compression rod, or both.

11. The collinear reduction clamp of claim 1, wherein the arm is arranged and configured to be axially moveable to adjust a length thereof.

* * * * *